March 23, 1943.    D. R. BARNEY ET AL    2,314,851

POWER FACTOR MEASURING SYSTEM

Filed April 30, 1942

INVENTORS  D. R. BARNEY
           G. W. WEAVER
BY
           G. H. Heydt.
           ATTORNEY Patented Mar. 23, 1943

2,314,851

UNITED STATES PATENT OFFICE 2,314,851

POWER FACTOR MEASURING SYSTEM

Duane R. Barney and Glenn W. Weaver, East Orange, N. J., assignors to Western Electric Company, Incorporated, New York, N. Y., a corporation of New York Application April 30, 1942, Serial No. 441,138

10 Claims. (Cl. 172—245)

This invention relates to measuring and indicating systems and more particularly to a system for indicating and measuring power factor.

It is the object of this invention to provide an indicating instrument for indicating directly the power factor of any particular load which may be connected to an alternating current circuit.

The foregoing object is attained by this invention by providing in combination a wattmeter having a current circuit and a voltage circuit, an amplifier equipped with automatic volume control connected in the current circuit of the wattmeter and a similar amplifier also equipped with automatic volume control connected in the voltage circuit of the wattmeter.

The invention may be better understood by referring to the accompanying drawing in which.

Figure 1:
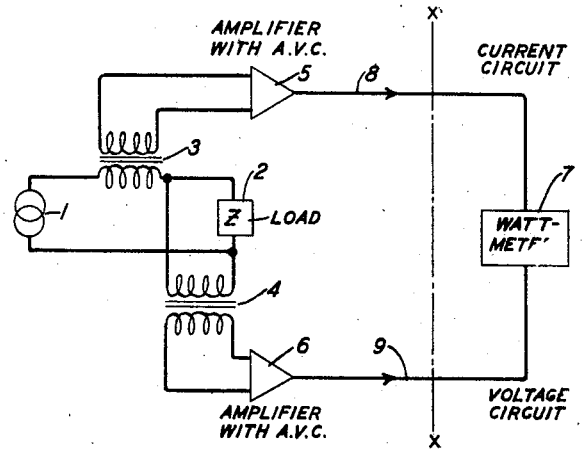
Fig. 1 illustrates schematically the essential elements combined to comprise the invention.

Referring now more particularly to Fig. 1, in which reference numeral 1 denotes an alternating current supply connected to an impedance load 2 through the primary winding of a current transformer 3. A suitable potential transformer 4 is connected with its primary across load 2. Automatic volume control amplifiers 5 and 6 are connected to the secondaries of current transformer 3 and potential transformer 4, respectively. These two automatic volume control amplifiers may be substantially identical in their circuit arrangements. The output of amplifier 5 is connected to the current circuit of a wattmeter 7 by way of circuit 8 while the output of amplifier 6 is connected to the voltage circuit of wattmeter 7 by way of circuit 9.

It is a well-known fact that the power indicated by a wattmeter is proportional to the product of three factors: the voltage applied to the impedance load, the current through the impedance load and the power factor thereof. Consequently, if some means is provided in the wattmeter circuit for maintaining constant at all times the product of the voltage and the current, the wattmeter indication will thereafter always be proportional to the power factor. In Fig. 1, automatic volume control amplifier 5 is designed to maintain constant the current to the current circuit of the wattmeter 7 irrespective of variations in line current through the primary of current transformer 3. Likewise automatic volume control amplifier 6 is designed to maintain constant the voltage applied to the voltage circuit of wattmeter 7 irrespective of variations in the applied voltage to load 2. It is evident, therefore, that the indications of wattmeter 7 will be proportional to the power factor of impedance load 2 so long as the voltage impressed on load 2 and the current flowing therethrough are within the ranges for which automatic volume control amplifiers 5 and 6 are designed to maintain control.

Figure 2:
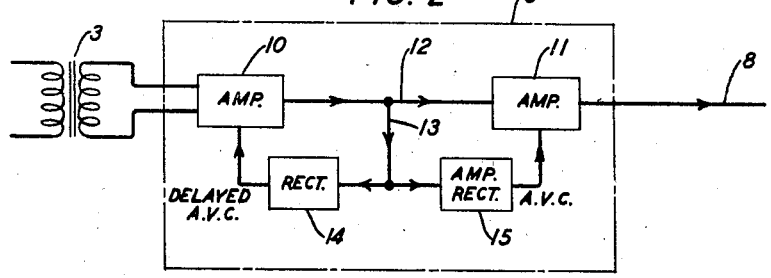
Fig. 2 illustrates schematically one preferred form of automatic volume control amplifier which may be used in either the current or voltage circuit of Fig. 1.

Fig. 2 discloses schematically a preferred form of automatic volume control amplifier which may be used for either the current circuit or the voltage circuit of Fig. 1. The reference characters for Fig. 2 refer specifically to the amplifier 5 in the current circuit of Fig. 1 but the arrangement disclosed is equally effective when used as amplifier 6 for the voltage circuit of Fig. 1.

The volume control amplifier 5 as disclosed in Fig. 2 comprises two amplifier sections 10 and 11. The output amplifier section 10 is applied to the input of amplifier section 11 by way of circuit 12. Some of the output of amplifier 10 is carried to rectifier 14 by way of circuit 13 to provide a backward-acting automatic volume control for amplifier section 10. Amplifier sections 10 and 11 may be any form of amplifier, preferably resistance coupled. Likewise the delayed action backward-acting automatic volume control may be of any of the well-known forms but preferably of the general type disclosed by United States Patent Re. 19,493, issued to Barber March 12, 1935 or as is shown in United States Patent Re. 20,442, issued to Ballantine on July 13, 1937.

Forward-acting, amplified, automatic volume control is provided for amplifier section 11 by taking part of the output from circuit 13 and applying it to the input circuit of amplifier-rectifier 15, the output whereof is applied to amplifier section 11 to provide automatic volume control therefor. The circuits for this section may also be of any well-known form but preferably of the type disclosed in United States Patent 1,574,780, issued to Affel on March 2, 1926 or as shown in the Ballantine patent mentioned above.

The delayed action feature for the backward-acting automatic volume control is of no importance in so far as this invention may be used for accurate indication of power factor. However, it is of some help in increasing the sensitivity of indication in low voltage or current ranges when using the apparatus for a breakdown indicator for reactances. In this connection it should be understood that every pure reactance should normally have a substantially zero power factor. However, should a reactance have defective insulation or for some other reason develop a relatively large power component, its power factor will immediately become of appreciable magnitude. For such purposes the exact value of the power factor is of no importance, but it is important to detect any marked change in power factor. The increased sensitivity provided by the delayed action feature extends the range of usefulness of this invention for detecting defective reactors having high reactances.

Figure 3:
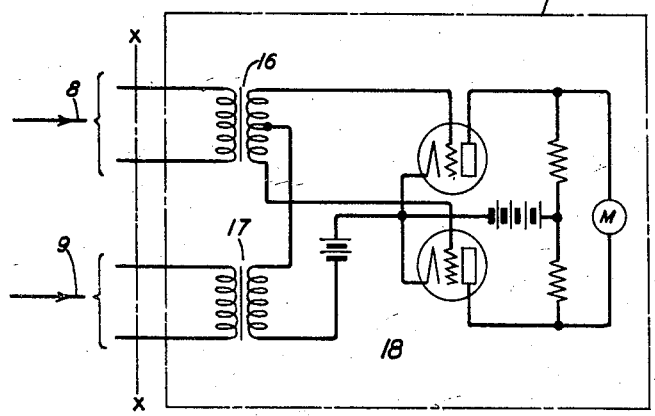
Fig. 3 is a circuit diagram disclosing a preferred form of wattmeter.

A preferred form of wattmeter circuit for wattmeter 7 is shown in Fig. 3. This circuit is substantially identical with the wattmeter circuit shown in United States Patent 1,586,533, issued to Peterson, June 1, 1926. Current circuit 8 and voltage circuit 9 are shown connected to the wattmeter circuit 18 through transformers 16 and 17, respectively. The operation of this circuit as a wattmeter is clearly disclosed in the Peterson patent. From the previous discussion it is clearly evident that if the voltages in transformers 16 and 17 are kept constant, meter M in the wattmeter circuit 18 will indicate power factor. In this connection it should be remembered that due to the automatic volume control action of amplifier 5 the voltage output thereof is maintained constant irrespective of variations in current flowing through the primary of transformer 3.

While a particular, preferred form of electronic wattmeter has been disclosed to be used in connection with this invention, it is obvious that other forms of wattmeters may be substituted therefor without departing from the invention. A particular, preferred form of automatic volume control system has also been disclosed in Fig. 2. It is likewise clearly obvious that this specific form of volume control system need not be employed in order to successfully practice this invention. It is only necessary to provide an automatic volume control system capable of maintaining the amplified volt-ampere product constant irrespective of variations in load current and load voltage throughout the range of interest.

What is claimed is:

1. A power factor indicator comprising in combination a wattmeter having a current circuit and a voltage circuit, an amplifier including automatic volume control means connected in the current circuit, and another amplifier also including automatic volume control means connected in the voltage circuit.

2. A power factor indicator comprising in combination a wattmeter having a current circuit and a voltage circuit, an amplifier including automatic volume control means connected in the current circuit, another amplifier also including automatic volume control means connected in the voltage circuit, each of said amplifiers comprising in combination at least two amplifier sections, a backward-acting automatic volume control means connected to one of said sections for control thereof, and a forward-acting automatic volume control means connected to another section for control thereof.

3. A power factor indicator comprising in combination a wattmeter having a current circuit and a voltage circuit, an amplifier including automatic volume control means connected in the current circuit, another amplifier also including automatic volume control means connected in the voltage circuit, each of said amplifiers comprising in combination an amplifying means, a backward-acting automatic volume control means having control over said amplifying means, and a forward-acting automatic volume control means also having control over said amplifying means.

4. A power factor indicator comprising in combination a wattmeter having a current circuit and a voltage circuit, an amplifier including automatic volume control means connected in the current circuit, another amplifier also including automatic volume control means connected in the voltage circuit, each of said amplifier circuits comprising in combination an amplifying means, a delayed-action backward-acting automatic volume control means having control over said amplifying means, and a forward-acting automatic volume control means also having control over said amplifying means.

5. A power factor indicator comprising in combination a wattmeter having a current circuit and a voltage circuit, an amplifier including automatic volume control means connected in the current circuit, another similar amplifier also including automatic volume control means connected in the voltage circuit, each of said amplifiers comprising in combination at least two amplifier sections, a delayed-action backward-acting automatic volume control means adapted for control over one of said amplifier sections, and a forward-acting automatic volume control means adapted for control over another of said amplifier sections.

6. The combination defined in claim 1 in which the wattmeter comprises in combination, two vacuum tubes connected in conventional balanced relation, an input circuit and an output circuit therefor, a meter connected for differential action in the output circuit and means connecting the input circuit to each of said amplifiers.

7. The combination defined in claim 2 in which the wattmeter comprises in combination, two vacuum tubes connected in conventional balanced relation, an input circuit and an output circuit therefor, a meter connected for differential action in the output circuit, and means connecting the input circuit to each of said amplifiers.

8. The combination defined in claim 3 in which the wattmeter comprises in combination, two vacuum tubes connected in conventional balanced relation, an input circuit and an output circuit therefor, a meter connected for differential action in the output circuit and means connecting the input circuit to each of said amplifiers.

9. The combination defined in claim 4 in which the wattmeter comprises in combination, two vacuum tubes connected in conventional balanced relation, an input circuit and an output circuit therefor, a meter connected for differential action in the output circuit and means connecting the input circuit to each of said amplifiers.

10. The combination defined in claim 5 in which the wattmeter comprises in combination, two vacuum tubes connected in conventional balanced relation, an input circuit and an output circuit therefor, a meter connected for differential action in the output circuit, and means connecting the input circuit to each of said amplifiers.

DUANE R. BARNEY.
GLENN W. WEAVER.